United States Patent
Vicente et al.

(10) Patent No.: US 7,589,625 B2
(45) Date of Patent: *Sep. 15, 2009

(54) WIRELESS SYSTEM WITH MULTI-DEVICE CONTROL

(75) Inventors: Nataniel Barbosa Vicente, Prospect, KY (US); Charles Stephen Pitzen, Farmington, CT (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/312,032

(22) Filed: Dec. 20, 2005

(65) Prior Publication Data

US 2007/0139210 A1    Jun. 21, 2007

(51) Int. Cl.
G08B 29/00 (2006.01)
G08B 1/08 (2006.01)
H02B 1/00 (2006.01)
H05K 5/00 (2006.01)

(52) U.S. Cl. .......... 340/506; 340/525; 340/539.1; 340/539.14; 340/638; 340/825.72; 361/600; 361/679

(58) Field of Classification Search .......... 340/506
See application file for complete search history.

(56) References Cited

U.S. PATENT DOCUMENTS

| 6,441,719 | B1* | 8/2002 | Tsui ............... 340/5.21 |
| 6,894,609 | B2 | 5/2005 | Menard et al. |
| 7,027,808 | B2 | 4/2006 | Wesby |
| 7,302,257 | B2 | 11/2007 | Taketsugu |
| 2004/0046637 | A1 | 3/2004 | Wesby Van Swaay |
| 2007/0144779 | A1* | 6/2007 | Vicente et al. ........ 174/520 |
| 2007/0205910 | A1 | 9/2007 | Guite et al. |
| 2007/0237137 | A1 | 10/2007 | McLaughlin |
| 2008/0004777 | A1 | 1/2008 | Quigley |

* cited by examiner

*Primary Examiner*—Donnie L Crosland
(74) *Attorney, Agent, or Firm*—Armstrong Teasdale LLP

(57) ABSTRACT

A control system includes an enclosure, a control panel, and a plurality of controls, indicators, or both mounted on the control panel or in the enclosure. At least some of the plurality of controls, indicators, or both are configured to wirelessly communicate with each other inside the enclosure, and at least some controls including wirelessly controlled relays are configured to control devices outside the enclosure. Also, the wirelessly configured controls, indicators, or both are further configured to communicate with a plurality of other controls, indicators, or both in the control system.

17 Claims, 1 Drawing Sheet

WIRELESS SYSTEM WITH MULTI-DEVICE CONTROL

CROSS REFERENCE TO RELATED APPLICATIONS

This application is related to an application of the same inventors entitled "WIRELESS CONFIGURABLE CONTROLS AND CONTROL PANELS AND ENCLOSURES THEREFOR" and filed on even date herewith, and which is hereby incorporated by reference in its entirety.

BACKGROUND OF THE INVENTION

This invention relates generally to control panels and more particularly to control panels useful for control of electrical equipment, especially factory and industrial electrical equipment, including, but not limited to motors and lighting.

Known control panels for electrical equipment (such as motors, lights or other factory electrical equipment) provide a plurality of switches and controls, most or all of which control currents between five amperes up to thousands of amperes. The control panels themselves can range in size from, for example, 0.3 m×0.3 m×0.1 m (12"×12"×4") up to at least 1.825 m×2.435 m×0.9125 m (6'×8'×4'). The switches and controls are hard-wired. Control panels entail significant manufacturing and labor costs due to application and option variation. Also, a single control panel product family may require several million catalog number permutations to support all available options.

BRIEF DESCRIPTION OF THE INVENTION

The present invention, in one aspect, provides a control system. The control system includes an enclosure, a control panel, and a plurality of controls, indicators, or both mounted on the control panel or in the enclosure. At least some of the plurality of controls, indicators, or both are configured to wirelessly communicate with each other inside the enclosure, and at least some controls including wirelessly controlled relays are configured to control devices outside the enclosure. Also, the wirelessly configured controls, indicators, or both are further configured to communicate with a plurality of other controls, indicators, or both in the control system.

In another aspect, the present invention provides a method for controlling a system. The method includes providing an enclosure, a control panel, and a plurality of controls, indicators, or both mounted on the control panel or in the enclosure. At least some of the plurality of controls, indicators, or both are configured to wirelessly communicate with each other inside the enclosure, and at least some of the controls include wirelessly controlled relays configured to control devices outside the enclosure. The method further includes using the wirelessly configured controls, indicators, or both to communicate with a plurality of others of the controls, indicators, or both.

In another aspect, the present invention provides a method for controlling electrical equipment. The method includes operating a control mounted on a control panel or in an enclosure including the control panel to produce a wireless signal contained within the enclosure, and using the wireless signal to operate a relay to control external electrical equipment.

Some configurations of the present invention advantageously reduce labor and manufacturing cost, in part by the elimination of a considerable amount of wiring. Furthermore, product availability can be increased, because fewer hard-wired control panel customizations are required. Configurations of the present invention are also configurable and upgradeable. Moreover, configurations of the present invention can advantageously require less inventory support, while providing higher reliability and potential space savings.

BRIEF DESCRIPTION OF THE DRAWINGS

The FIGURE is a representative pictorial diagram of a control panel configuration of the present invention.

DETAILED DESCRIPTION OF THE INVENTION

Figure 1:
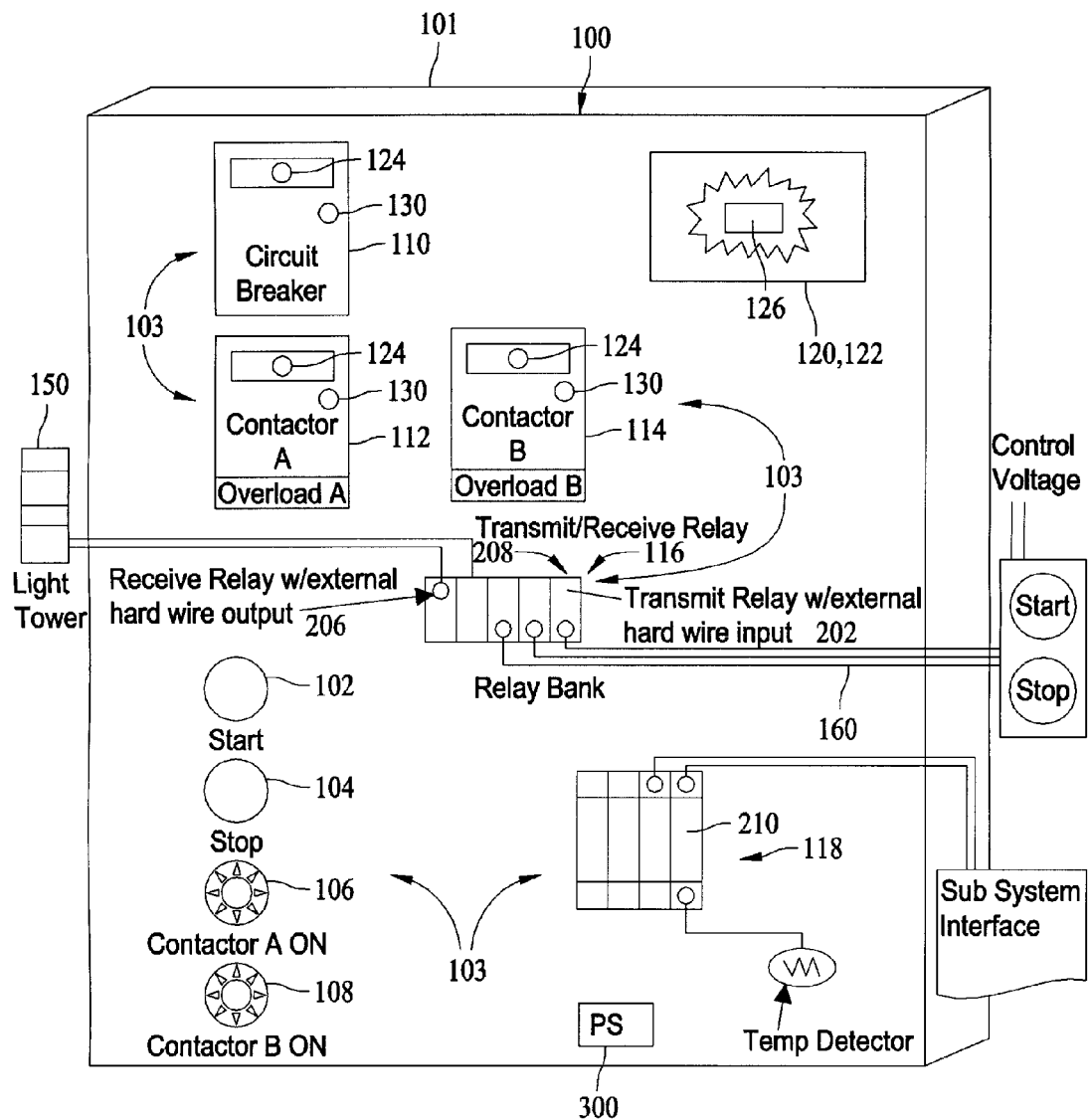

In some configurations of the present invention and referring to the FIGURE, a control panel 100 is provided with a selection of switches and controls that communicate wirelessly inside control panel 100 itself. In some configurations, control panel 100 is part of an enclosure 101 that can comprise a metal that serves as a shield or cage for radio transmissions, so that the radio transmissions inside enclosure 101 do not escape, and/or interfering transmission from outside enclosure 101 do not enter.

Examples of controls and indicators that can be provided in a configuration of control panel 100 include a start switch 102, a stop switch 104, a contactor "A" lighted indicator 106, a contactor "B" lighted indicator 108, circuit breaker 110, switches 112 and 114, and relay banks 116 and 118. Some of the relays in relay banks 116 and/or 118 are configured to control external devices, such as lighting, motors, etc. Controls and indicators (generically referred to as controls and indicators 103) can include, but are not limited to, contactors, starters, relays, overload and other protective relays, push buttons, selector switches, indicating lights, auxiliary status contacts, PLCs, terminal boards, thermostats, sensing devices, circuit breakers, and circuit breaker accessories plus other coil actuated devices. Wireless controls and indicators 103 are contained within enclosure 101 or are surface mounted on control panel 100 and have the ability to transmit and/or receive wireless communications from other controls and/or indicators 103 inside enclosure 101 or mounted on panel 100. Each wireless control or indicator 103 is individually configured to communicate, control, and/or report status with one or more other wireless controls or indicators 103 within enclosure 101 or mounted on the surface of control panel 100.

In a number of configurations, wireless controls and indicators 103 are configured using a human-machine interface/man-machine interface (HMI/MMI) software package. A personal computer (PC) 120 (which may have an interface 122 located on panel 100) can be provided for this purpose. The interface between PC 120 and wireless controls and indicators 103 may be either wireless or hard-wired.

A wireless transceiver is not shown in the drawings, but a separate wireless transceiver is contained within or otherwise electrically responsive to and in close proximity with each wireless control and indicator 103, except that only a wireless transmitter or a wireless receiver can be provided for indicators 103 that do not naturally require a transceiver. For example, start switch 102 only indicates its state to another component, and hence, requires only a transmitter. By contrast, lighted indicator 106 indicates the state of another component and does not have to send signals to other components, and hence, requires only a receiver. Also, some relays in relay bank 116 and 118 may require only a receiver (such as relay 206 in bank 116, which receives status indications for a light tower 150 mounted, for example, on top of enclosure 101) or a transmitter (such as relay 208 in bank 116, which responds to an external, hard-wired input 160. Other relays may require transceivers, which can be used not only for controlling the relay, but also to confirm status or operate other relays, such as in a system requiring activation of two controls, one of which must be activated after another. Other relays, such as relays 210 in bank 118, may not require a transmitter or a receiver at all, because configurations of the present invention do not require all controls and switches to operate wirelessly, i.e., some can be hard-wired.

Some configurations of the present invention utilize start switch 102 to control a motor. In some configurations, the associated transceiver is programmed to transmit a signal to a transceiver associated with relay (e.g., relay 202) in relay bank 116. The transceiver associated with relay 202 causes relay 202 to engage. The depression of stop switch 104 initiates a similar process that results in relay 202 becoming disengaged.

For some controls or indicators 103, associated wireless transceivers can be programmed to acknowledge a received signal either to the control or indicator that initiated a transmission, or to another control or indicator, or to a plurality of controls and/or indicators. Thus, a series of events of arbitrary complexity can be programmed to occur as a result of a single control switch being activated or deactivated. For example, when switch 112 is activated, not only is a relay 204 in relay bank 116 engaged, but light 106 is also lighted.

Some system configurations provide controls and indicators 103 with individual wireless transmitters and receivers, with acknowledgement, random address, multi-device control, system circuit analysis, component and/or system lock-out, individual component and/or system programmability and/or error check, and/or real-time branch and system status indicators. (Real time, as used herein, means that the indicators provide an essentially current indication of present status, or a sufficiently rapid indication to be useful for a person actively monitoring a system to take useful action.)

Each wireless control or indicator within control panel 100 has the ability to transmit and/or receive a pre-determined signal or signals. The digital signal data may contain, but is not limited to containing, any or all of (a) a unique address, (b) communication mode, (c) data, (d) product ID code, (e) branch code, (f) circuit identification, and/or (g) acknowledgement request.

A transmitting component 103 may request an acknowledgement response from a receiving component 103 that a signal has been detected. A light emitting diode LED 124 or other indicating device on the transmitting device and/or receiving device (or the transmitter or receiver component 103 itself) provides an indication of confirmation of errorless communication between both devices.

Each control or indicator 103 in some configurations also generate a random address. Random addresses may be pre-assigned or may be assigned using direct or system programming. A control or indicator 103 in some configurations may be provided with a button 130 or other means to allow direct programming. A controls or indicator 103 in some configurations may also be programmed using a human-machine interface/man-machine interface (HMI/MMI) PC 120 or other similar interface. In the event of a conflict, a different address is automatically selected in some configurations of the present invention.

A wireless control or indicator 103 in some configurations can communicate with multiple controls or indicators 103 within control panel 100. Communication may include, but is not limited to data including a status check, a control signal, or an annunciation.

Master circuit switching provides the ability to analyze a circuit configuration and provide programming and configurations control. A master 126 is a predefined circuit that is installed on a PC or HMI/MMI or similar interface (e.g., a handheld digital assistant), such as interface 122 or PC 120. The PC or HMI/MMI interface will request information from the controls and indicators 103 and will perform matching analysis to detect errors and issue corrective action.

In some configurations of the present invention, one or more wireless controls or indicators 103 has a lock-out mode to prevent inadvertent setting and/or configuration changes. The lockout feature may be locally set at the device level using a button or similar device or by using PC 120 or MMI/HMI interface 122. Some configurations are also password protected for anti-tamper and critical applications.

A real-time branch and system status component is provided in some configurations of the present invention. With an HMI/PC, this component allows a system or branch to be monitored, thereby giving real-time connection data and individual control or indicator 103 status. Each control or indicator 103 is identified in the data stream by a unique ID number. The HMI or PC interface can have a plurality of communication modes available, which may include, for example, "Status Request," "Last control function performed," "Active and/or inactive device polling," and/or "Error or last detected error."

In various configurations, individual wireless controls or indicators 103 may contain a button 130 and a light-emitting diode (LED) 124 and/or other switches and/or indicators to allow or facilitate local programming. Some configurations permit one or more wireless controls or indicators 103 to be programmed using a pre-defined circuit loaded into HMI/MMI 122 or PC 120. In some configurations, the interface has a separate wireless card (not shown in the FIGURE) to allow communication between HMI/MMI 122 or PC 120 and programmable devices.

In some configurations, a low power distribution system (of which power supply 300 is part) is provided to power the transceivers, transmitters, receivers, LEDs, etc., and may be used to operate relays and/or indicators.

It will thus be appreciated that configurations of the present invention reduce labor and manufacturing cost, in part by the elimination of a considerable amount of wiring. Furthermore, product availability can be increased, because fewer hard-wired control panel customizations are required. Configurations of the present invention are also configurable and upgradeable. Moreover, configurations of the present invention can advantageously require less inventory support, while providing higher reliability and potential space savings.

While the invention has been described in terms of various specific embodiments, those skilled in the art will recognize that the invention can be practiced with modification within the spirit and scope of the claims.

What is claimed is:

1. A control system comprising:
   an enclosure;
   a control panel;
   a plurality of controls, indicators, or both mounted on said control panel or in said enclosure; and
   a plurality of wireless communication units each comprising at least one of a wireless transmitter, a wireless receiver, and a wireless transceiver, each said wireless communication unit electrically responsive to and in close proximity with a corresponding one of said plurality of controls, indicators, or both to enable said plurality of controls, indicators, or both to wirelessly communicate directly with each other inside said enclosure, wherein a first one of said plurality of controls, indicators, or both comprises a relay that changes state upon receipt of a first wireless signal transmitted by a second one of said plurality of controls, indicators, or both, the change of state controls a device outside said enclosure.

2. A control system in accordance with claim 1 wherein a third one of said plurality of controls, indicators, or both is programmed to wirelessly transmit a second wireless signal to a fourth one of said plurality of controls, indicators, or both, and to transmit a wireless request for an acknowledgement response from said fourth one of said plurality of controls, indicators, or both.

3. A control system in accordance with claim 1 wherein each one of said plurality of controls, indicators, or both is programmed to generate a random address, and further to automatically select a different address in the event of an address conflict with a different one of said plurality of controls, indicators, or both.

4. A control system in accordance with claim 1 wherein said wireless communications include at least one of status checks, control signals, or annunciations.

5. A control system in accordance with claim 1 wherein at least one of said wirelessly configured controls, indicators, or both has a lock-out mode wherein said at least one of said wirelessly configured controls, indicators, or both is not responsive to re-programming.

6. A control system in accordance with claim 5 wherein said lock-out mode is password protected.

7. A control system in accordance with claim 1 further comprising an interface or PC programmed to monitor said plurality of controls, indicators, or both in real time and to provide a status indication for said plurality of controls, indicators, or both.

8. A control system in accordance with claim 7 wherein said interface or PC is programmed to use ID numbers in a data stream to identify each one of said plurality of controls, indicators, or both.

9. A control system in accordance with claim 7 wherein said interface or PC is operable in at least one monitoring mode from the group consisting of status request, last control function performed, active and/or inactive device polling, and error or last detected error.

10. A method for controlling a system comprising:
coupling a control panel and an enclosure;
mounting a plurality of controls, indicators, or both on the control panel or within the enclosure;
mounting a plurality of wireless communication units on the control panel or within the enclosure, each one of the plurality of wireless communication units comprising at least one of a wireless transmitter, a wireless receiver, and a wireless transceiver, each wireless communication unit of the plurality of wireless communication units is electrically responsive to and in close proximity with a corresponding one of the plurality of controls, indicators, or both such that the plurality of controls, indicators, or both may wirelessly communicate directly with each other inside the enclosure;
commanding a first one of the plurality of controls, indicators, or both to transmit a wireless signal;
receiving the wireless signal at a second one of the plurality of controls, indicators, or both, the wireless signal causes a change of state of the second one of the plurality of controls, indicators, or both, the change of state controls a device outside the enclosure.

11. A method in accordance with claim 10 further comprising programming the first one of the plurality of controls, indicators, or both to request an acknowledgement response from the second one of the plurality of controls, indicators, or both.

12. A method in accordance with claim 10 further comprising programming each one of the plurality of controls, indicators, or both to generate a random address, and further to automatically select a different address in the event of an address conflict with a different one of said plurality of controls, indicators, or both.

13. A method in accordance with claim 10 wherein the wireless communications include at least one of status checks, control signals, or annunciations.

14. A method in accordance with claim 10 further comprising setting at least one of the plurality of controls, indicators, or both in a lock-out mode wherein the at least one of the plurality of controls, indicators, or both is not responsive to re-programming.

15. A method in accordance with claim 10 further comprising monitoring the plurality of controls, indicators, or both in real time to provide a status indication for the plurality of controls, indicators, or both.

16. A method in accordance with claim 15 further comprising using ID numbers in a data stream to identify each one of the plurality of controls, indicators, or both.

17. A method in accordance with claim 15 wherein said step of monitoring further comprises using an interface or PC to monitor the plurality of controls, indicators, or both in real time, and configuring the interface or PC in a monitoring mode selected from the group consisting of status request, last control function performed, active and/or inactive device polling, and error or last detected error.

\* \* \* \* \*